US011969395B2

(12) United States Patent
Hunter

(10) Patent No.: US 11,969,395 B2
(45) Date of Patent: Apr. 30, 2024

(54) FEEDING NIPPLE WITH PENETRABLE SIDE ENTRY TUBE FOR ADMINISTRATION OF LIQUID MEDICINE

(71) Applicant: Lauren Nicole Hunter, Randleman, NC (US)

(72) Inventor: Lauren Nicole Hunter, Randleman, NC (US)

( * ) Notice: Subject to any disclaimer, the term of this patent is extended or adjusted under 35 U.S.C. 154(b) by 201 days.

(21) Appl. No.: 17/589,809

(22) Filed: Jan. 31, 2022

(65) Prior Publication Data

US 2023/0240946 A1 Aug. 3, 2023

(51) Int. Cl.
*A61J 11/00* (2006.01)

(52) U.S. Cl.
CPC .................................. *A61J 11/0005* (2013.01)

(58) Field of Classification Search
CPC .................................................... A61J 11/0005
USPC ............... 215/11.4, 11.5, 11.1, 260; 128/890
See application file for complete search history.

(56) References Cited

U.S. PATENT DOCUMENTS

| | | | | |
|---|---|---|---|---|
| 2,321,236 A * | 6/1943 | Parkin | A61J 9/04 215/11.1 |
| 2,680,441 A * | 6/1954 | Krammer | A61J 7/0046 215/11.1 |
| 2,989,961 A * | 6/1961 | Blanchett | A61J 11/02 215/11.4 |
| 3,426,755 A | 2/1969 | Clegg | |
| 3,797,486 A * | 3/1974 | Shaps | A61M 39/22 604/257 |
| 4,581,015 A * | 4/1986 | Alfano | A61M 39/04 604/232 |
| 5,176,705 A | 1/1993 | Noble | |
| 5,354,274 A | 10/1994 | Demeter | |
| 5,611,776 A | 3/1997 | Simmons et al. | |
| 5,620,462 A | 4/1997 | Valenti | |
| D384,748 S | 10/1997 | Dunn | |
| 5,772,685 A | 6/1998 | Crowe et al. | |
| 6,126,679 A * | 10/2000 | Botts | A61J 7/0053 215/11.1 |

(Continued)

FOREIGN PATENT DOCUMENTS

| | | |
|---|---|---|
| CN | 2633285 Y | 8/2004 |
| CN | 213346914 U | 6/2021 |

(Continued)

*Primary Examiner* — Don M Anderson
*Assistant Examiner* — Justin Caudill
(74) *Attorney, Agent, or Firm* — Joel Webster Sawyer

(57) ABSTRACT

The invention is a hollow nipple containing a side-entry tube and aperture that solves the problem of administering fluid medicines to infants or babies by combining the comfort of a common baby bottle, containing accustomed milk or formula, with the use of an industry common, over-the-counter oral medicine syringe by allowing for the syringe to be inserted into the side-entry tube and aperture so that the medicine can mix with the milk or formula and be quickly consumed while the care provider has the option of manually regulating the flow of the medicine into the nipple. The invention therefore avoids the need for administering such fluid medicine directly into the mouth, or even mixing it into the contents of the bottle where the medicine may not be fully or timely consumed. The invention has applications not only with human infants and babies but also in the field of animal care.

1 Claim, 3 Drawing Sheets

(56) References Cited

U.S. PATENT DOCUMENTS

Figure 1:
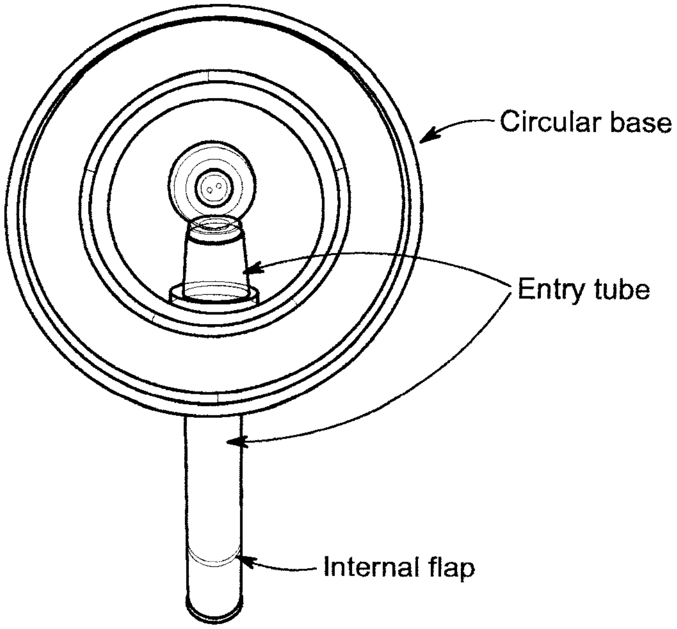

| | | | | |
|---|---|---|---|---|
| 6,684,918 | B1 | 2/2004 | Thilly et al. | |
| 6,966,904 | B2 | 11/2005 | Ruth et al. | |
| 7,320,678 | B2 | 1/2008 | Ruth et al. | |
| 7,670,322 | B2 * | 3/2010 | Fangrow, Jr. | A61M 39/24 604/247 |
| D620,125 | S | 7/2010 | Rees et al. | |
| 8,763,827 | B2 | 7/2014 | Cohn | |
| 10,780,025 | B2 | 9/2020 | Oates, II et al. | |
| 2004/0182813 | A1 * | 9/2004 | Gilmore | A61J 11/0005 215/11.4 |
| 2006/0100603 | A1 * | 5/2006 | Thwaits | A61J 11/0005 604/533 |
| 2016/0120763 | A1 * | 5/2016 | Conner | A61J 13/00 604/76 |
| 2020/0289376 | A1 * | 9/2020 | Spivak | A61J 13/00 |

FOREIGN PATENT DOCUMENTS

| | | | | |
|---|---|---|---|---|
| SE | 467482 | B * | 7/1992 | A61J 11/0005 |
| WO | WO-0119319 | A1 * | 3/2001 | A61J 11/0005 |
| WO | WO-2014055696 | A1 | 4/2014 | |
| WO | WO-2016193523 | A1 * | 12/2016 | A61J 11/0005 |

* cited by examiner

FEEDING NIPPLE WITH PENETRABLE SIDE ENTRY TUBE FOR ADMINISTRATION OF LIQUID MEDICINE

STATEMENT REGARDING PRIOR DISCLOSURES MADE BY THE INVENTOR

The first disclosure of the invention was made to the inventor's husband on Sep. 20, 2021, and later to the inventor's father on Oct. 5, 2021. The inventor engaged in experimental use on Oct. 28, 2021 by administering liquid Tylenol to her child using the invention.

SPECIFICATION

I. Field of the Invention

Feeding bottles and nipples are used in pediatric medicine and also the veterinary care of animals.

II. Background of the Invention

Baby bottles have been used throughout parts of human history, at least for the past two thousand years, but they have only become more frequent in use over the past century. As of 2018, the global value of the baby bottle industry was estimated to be 2.6 billion dollars. Much of this success can be attributed to the materials used in making baby bottles, along with methods of improving sterilization techniques. The invention of rubber nipples, capable of withstanding the rigors of heated sterilization, increased their use, and also made for a more pleasing and a less effortful experience for infants.

Material for the actual bottles was found wanting, however, since glass was potentially dangerous if broken, and also prohibitively heavy in certain cases for the infant to hold, and certain metals were not palatable enough. The invention of plastics, especially materials that could be heated in order to be sterilized, rapidly advanced the market for baby bottles, which has grown exponentially in the last fifty years. Because of scientific advances, baby bottles are still manufactured in glass and metal, but also now stainless steel and silicone.

The parts of the modern baby bottle are as follows. A nipple is the part that the infant or baby sucks; it has a circular base and concave-like, uniform sides that narrow to a roundish tip that features a slit or a needle-like hole through which formula, breast milk, or an electrolyte solution can pass upon the application of pressure. The nipple fits into a circular collar, hollow in the center, that typically contains grooves so that it can be twisted onto a cylindrical bottle. The bottle, of course, contains the formula, breast milk, or electrolyte solution. Outside of these three parts—the nipple, collar, and bottle—small brushes are also employed to clean these parts from the build-up of these various nutrient sources across uses that could potentially, if not cleaned, result in bacteria build-up. To prevent this, all are made of materials that can withstand sufficient heat in order to sterilize them.

Infants and babies sometimes need medicine, which was the impetus for the invention. For example, a common type of medicine would be over-the-counter fluid Tylenol or Ibuprofen that come with a plastic syringe for administration. Rather than administer the medicine directly into the mouth, the invention improves upon the administration by allowing the fluid medicine to be injected into the nipple of the baby bottle so that it mixes into the contents and can be immediately consumed while in the act of feeding. In this fashion, the unfamiliarity of the medicine, which the baby may not find amenable, can be mixed with the comfort of the bottle's contents to ease the manner of administration.

III. BRIEF SUMMARY OF THE INVENTION

Often if not all of the time inventions serve to fill so-called gaps in the market place and to aid in the ease, health, and comfort of modern life, and the present invention is no exception to this rule. The invention concerns baby bottles and the application of fluid medicine. And the invention covers instances of whether this medicine is over-the-counter or prescription, and whether administered in a pediatric, healthcare setting, or within a home environment. Specifically, the invention is a new kind of hollow nipple that contains a side-entry tube and an aperture that is capable of having an oral medicine needle inserted so that the medicine can be placed into the nipple while in the act of feeding.

As such, the baby bottle is contemplated to contain either formula or milk, or any other appropriate liquid baby food, of a kind that the infant or baby is accustomed to. The invention allows the medicine to enter and mix with this food so that the baby will consume the medicine while in the act of feeding. There is no clear, commonly accepted industry method for the introduction of pediatric fluid medicines other than placing the oral medicine syringe, which commonly accompanies over-the-counter fluid medicines such as liquid Tylenol, directly into the mouth of the infant or baby. This can be problematic when the medicine is spit out, and also runs the risk of dripping and not being consumed. Hospital or other pediatric medical professionals may make use of cylindrical syringes wherein the fluid medicine is capable of being pre-inserted, but no invention allows for the introduction of fluid medicine into the comfort of a child's normal baby bottle and nipple while in the act of feeding, especially given that many times fluid medicine is administrated at home by a parent and not within a hospital setting.

IV. BRIEF DESCRIPTION OF THE DRAWINGS

FIG. 1 depicts a view from the bottom of the nipple, where the circular base is closest in view, and the entry tube is depicted showing the internal portion that is inside the hollow region of the nipple and also the external portion. The location of the internal flap is marked.

Figure 2:
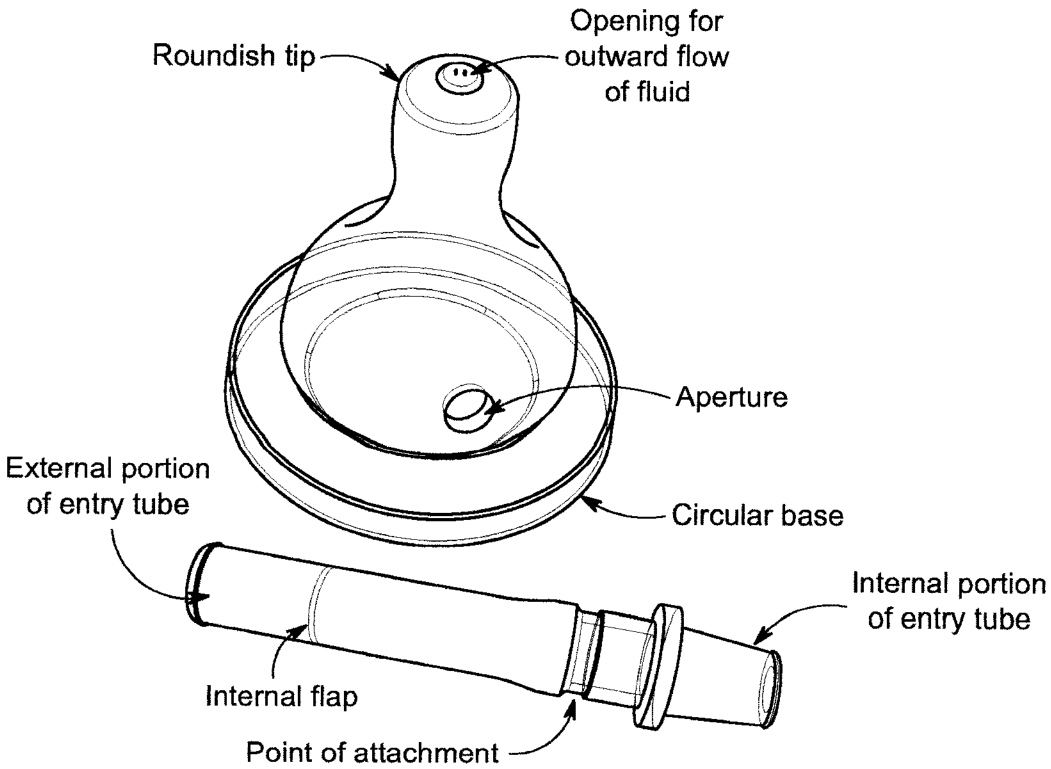

FIG. 2 depicts the nipple from a side view with entry tube detached. The external portion of the entry tube is marked, which is the portion that would be outside of the nipple when secured, and the corresponding internal portion of the entry tube is also labeled. The point of attachment represents the area where the entry tube is secured in the nipple; the location of the internal flap is marked. The raised edge is shown in between the point of attachment and the arrow pointing to the internal potion of the entry tube. With the entry tube detached, the location of the aperture where the entry tube fits is clearly seen. The uniform, concave-like region between the roundish tip and the circular base is also clearly shown. The opening on the roundish tip where the outward flow of fluid take place is also marked. The entry tube has two mouths, an entry mouth where a syringe with liquid medicine enters and an exit mouth where liquid medicine exits. The entry mouth is located on the end of the entry tube labeled external portion of entry tube, and the exit mouth is located on the end nearest the internal portion of the entry tube.

Figure 3:
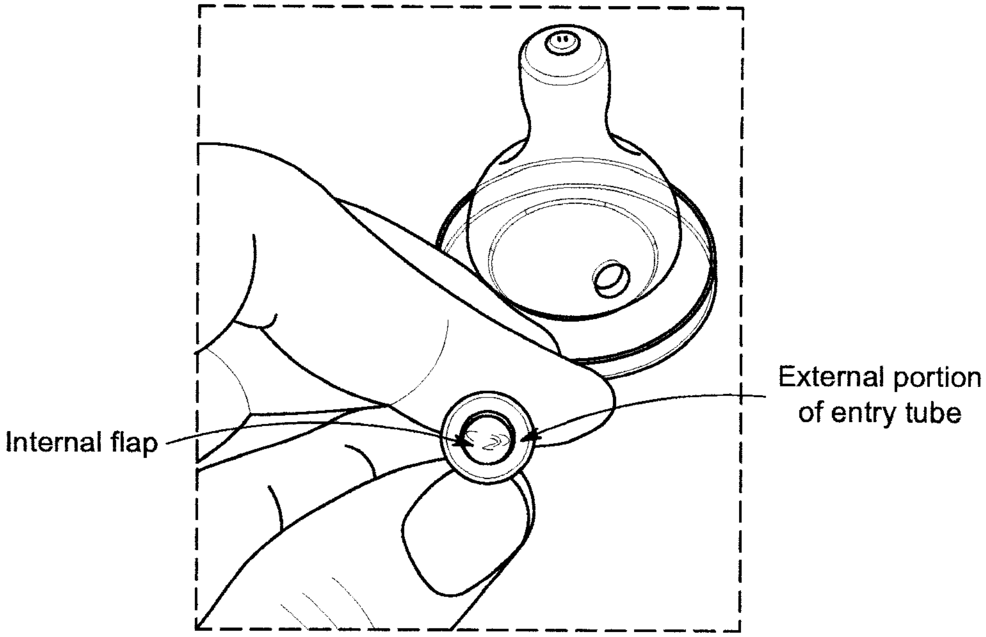

FIG. 3 depicts an angle where the external portion of the entry tube is shown at the opening or mouth; the internal flap is depicted as inside the entry tube.

Figure 4:
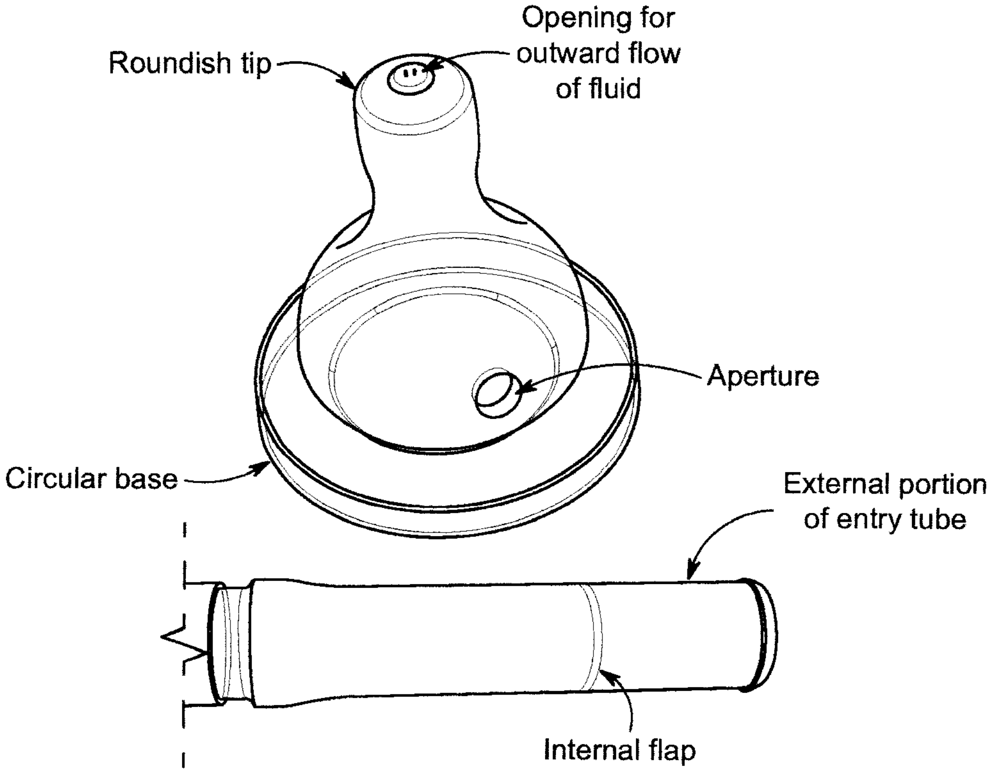

FIG. 4 depicts the external portion of the entry tube, and the location of the internal flap. The roundish tip of the nipple is shown, as well as the opening for outward flow of fluid, and the uniform, concave-like region in between it and the circular base. The aperture is also shown.

Figure 5:
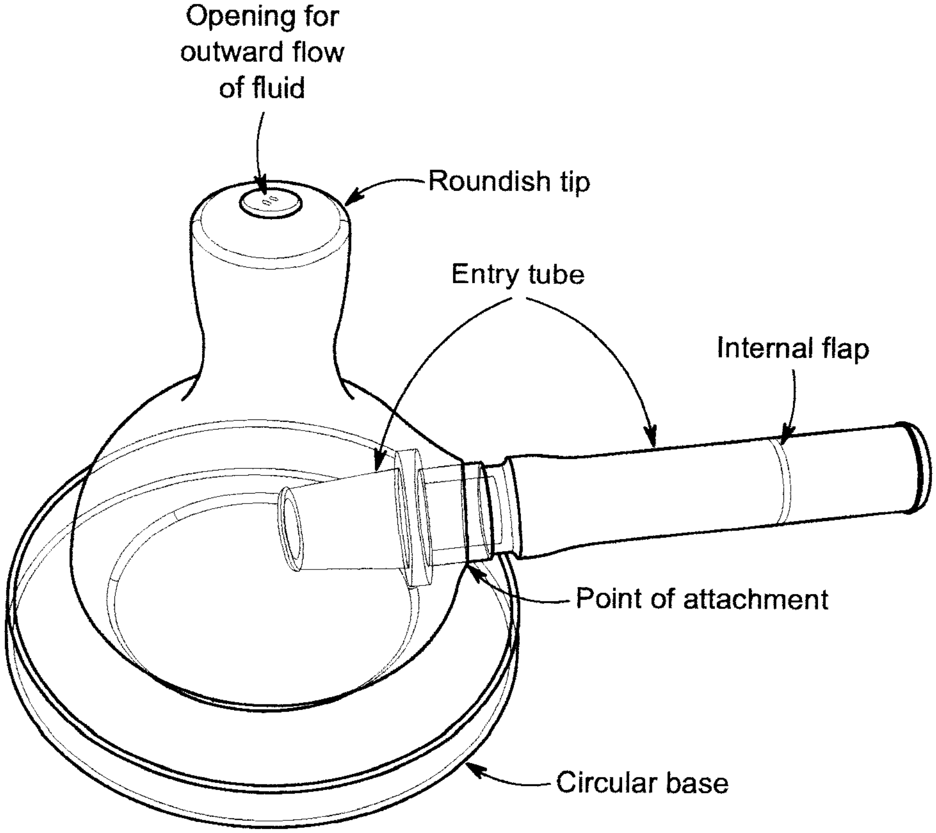

FIG. 5 depicts the baby nipple apparatus from a side angle. The opening for the outward flow of fluid is depicted on the roundish tip. The entry tube is shown, and the point of attachment is marked. Both the internal portion and the external portion of the entry tube are depicted. The internal flap is marked, along with the circular base. The raised edge of the entry tube is shown on the internal portion the nipple, secure against the inside wall.

V. DETAILED DESCRIPTION OF THE INVENTION

A. Introduction

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

B. Baby Nipple Apparatus for the Administration of Liquid Medicines

The invention is a baby nipple apparatus that aids in the administration of liquid medicine to infants and babies. Medicines such as over-the-counter Tylenol or Ibuprofen are commonly bottled as fluids, and these bottles typically come with syringes that ostensibly are used to administer the medicine directly into the mouth. This process can be tedious, as the infant or baby, who very well could be sick, is capable of reacting negatively to this administration, possibly even spitting out the medicine. Moreover, it might be the case that the infant refuses to take the medicine in entirety. These are problems that the invention sets out to alleviate if not solve entirely.

Here, the invention facilitates the administration of liquid medicine by pediatric care providers, including parents. Baby bottles are frequently used to feed infants and babies up until after their first birthday, which includes both pediatric formula and even breast milk so that care providers other than the mother can feed the infant. In fact, other than breast feeding, baby bottles are used almost exclusively as a key instrument to provide nourishment to those in the beginning stage of life.

The invention is a new type of bottle nipple yet made of the same material as those readily found in the market. That is, it is capable of taking the place of the conventional bottle nipple that comes in the packaging of the bottle. The invention contains a penetrable side entry tube through which liquid medicine can be injected directly into the nipple. When elevated, as when the infant is feeding, the medicine mixes directly with the contents of the bottle, and is immediately consumed by the infant while in the act of feeding.

This side entry valve is in the form of a cylindrical tube, a portion of which is in the internal portion of the bottle, and a second portion on the external region. As the tube is straight, it appears as if this tube has punctured or otherwise fastened within the nipple, and the tube fastens within the nipple by having a circular, uniform raised edge on the interior portion so that, when pushed or inserted into the aperture from the internal portion of the nipple, the raised edge stops the tube and secures it by way of pressure and the uniform fit of the tube in the aperture. Conversely, the tube can be removed from the nipple by being pulled from the direction of the internal region of the nipple.

The baby nipple is characterized like those in the marketplace by a roundish tip and concave-like, uniform sides that broaden to a circular bottom and narrow to a roundish tip. The tip has an opening for the expression of liquids, and this tip is in the form of either a slit or a needle-like hole. The bottom is capable of being fitted into a collar. The collar is a circular, hollow piece, narrow in height, that typically is grooved so that it fastens by screwing onto a baby bottle. The region between the tip and the bottom is where a single aperture or roundish hole is found, and the side entry tube is secured through this aperture. This tube is hollow but contains an internal flap or otherwise penetrable obstruction that is substantially connected to the walls of the tube, and that is penetrable from the outside of the nipple to the inside, and not from the inside to the outside. The entry tube, which is substantially hollow, therefore has two openings or mouths, an entry mouth on the external portion where the syringe enters and an exit mouth on the internal portion of the nipple where liquid medicine exits. This entry tube allows for a syringe or other needle-like, solid object to penetrate the flap or obstruction, and by penetrating the flap allows for the liquid medicine to be inserted into the inner part of the nipple, where it will immediately mix with the formula, or liquid food, and quickly consumed in the act of feeding.

The reason that the entry valve is located on the nipple as opposed to the bottle, and even mixed into the formula before the nipple and collar is fastened, is to allow the medicine to be administered while the infant is in the process of feeding. That is, the medicine is administered both while the infant or baby is in the act of feeding, and the bottle is tilted so that the bottom of the bottle is higher than the top so that gravity takes the formula into the nipple. This maintains the comfort of the routine baby bottle. A further feature of the invention is that by placing the entry tube in this position, the pediatric care provider is able to regulate the rate in which the medicine is administered. This is important because the medicine may, because of its taste or otherwise unfamiliarity, upset the baby and disrupt the feeding process when this medicine is administered directly into the mouth. By injecting the fluid medicine into the nipple during feeding, the pediatric care provider can administer the medicine over a period of time so that the ratio of the medicine in the formula is palatable enough so as to not disrupt the feeding process. In other words, not too much, too soon. Moreover, given that medicine is many times being administered because of illness, a baby has a proclivity for sensitivity to the unknown, which can also test the patience of the care provider. So, the invention not only improves upon the accurate and timely administration of fluid medicine by making the process more amenable to the patient, but also by improving the ease of administration for the care provider. And, the invention employs a flap which creates a one-way obstruction within the tube so that fluid cannot flow outward from the bottle, a feature which enables feeding as described herein. This flap is located on the portion of the entry tube that is external or outside of the nipple. Without this flap, or one-way penetrable obstruction, fluid inside the bottle, when elevated into the nipple, could flow back out of the entry tube. Moreover, neither can the entry tube be penetrated with a syringe from the direction of the inside, out.

A further advantage of the apparatus described herein is that it can be readily and efficiently used with baby bottles and collars found in the marketplace, even a specific bottle or bottle-type that the infant or baby typically uses. Since many times care providers are using baby bottles that are commercially available, that is, found at a local pharmacy, the invention, by fitting onto these common baby bottles, renders the invention conveniently and readily usable.

Given that not only human infants and babies are bottle fed, the invention also has applications in the field of animal care for veterinarians, and would include instances even

I claim:

1. A baby nipple apparatus characterized by a roundish tip and a circular bottom, with a uniform, concave-like region from said tip to said bottom, where said tip contains an opening for the expression of a liquid and said bottom is circular and near the halfway point of said region there is positioned an aperture in which a hollow tube penetrates said nipple such that a portion is located on the exterior of said nipple and a remaining portion is located in the internal space of said nipple, and wherein said tube contains an internal flap that is connected to the walls of said tube so that an obstruction to said liquid is created, where said flap being located in the area of said tube which is on said exterior of said nipple, where said flap prevents the exiting of said liquid through said tube, and where said flap allows for the introduction of fluid oral medicine into said internal space through said tube.

* * * * *